March 4, 1930.   H. PATTERSON   1,749,391
BEARING
Filed June 25, 1927
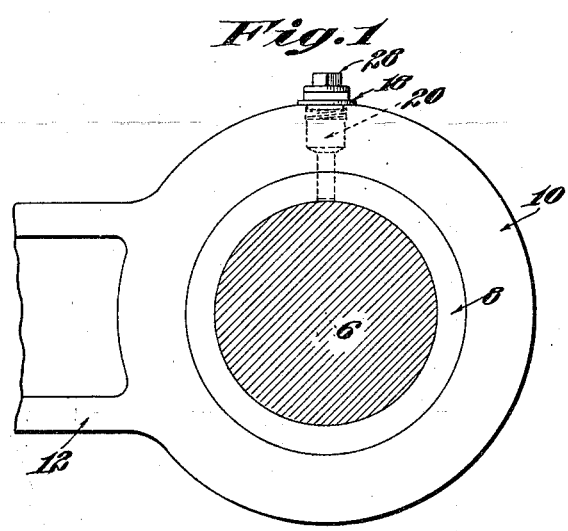
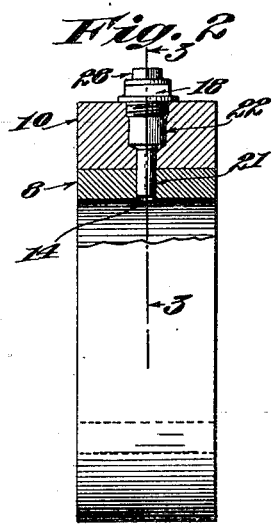
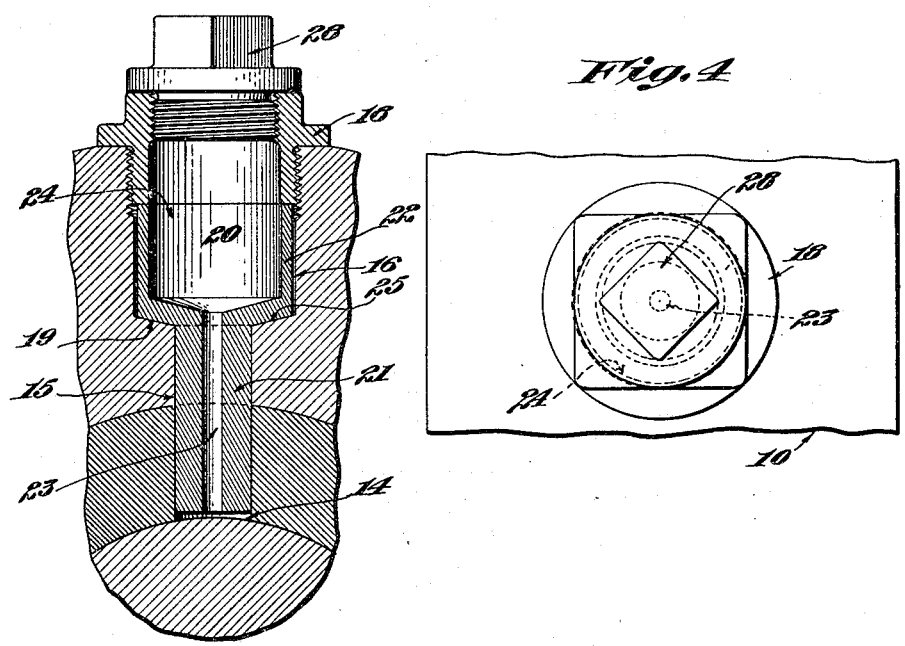
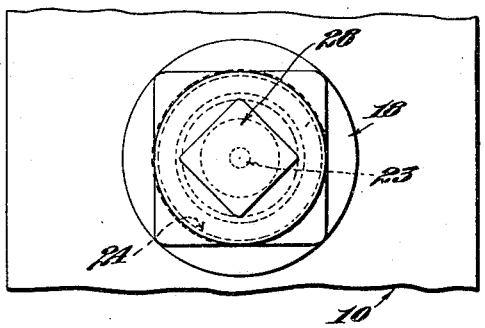
Inventor
Herbert Patterson Patented Mar. 4, 1930

1,749,391

UNITED STATES PATENT OFFICE

HERBERT PATTERSON, OF GREENFIELD, MASSACHUSETTS, ASSIGNOR OF ONE-HALF TO EDWARD M. ABERCROMBIE, OF DEERFIELD, MASSACHUSETTS

BEARING

Application filed June 25, 1927. Serial No. 201,298.

The present invention relates to bearings and more particularly to that type of bearing in which the bushing is held in place and from rotation with the shaft by means of a keeper.

The usual type of the bushing keeper as employed, for example, in locomotive side rod bearings, comprises a threaded hollow pin which engages with the bushing and the side rod. A space is provided above the keeper for containing a supply of lubricant. The shearing stress on the pin, combined with the constant vibration of the parts, often results in either shearing of the pin or stripping of the threads and consequent forcing of the pin into the grease container. In either case, relative rotational movement is permitted between the bushing and the side rod, throwing the lubricating openings out of register and causing excessive heating because of the fact that their engaging surfaces are not lubricated.

The object of the present invention is to devise a bearing comprising a bushing and keeper therefor which avoids the liability of relative movement between the bushing and the bearing housing, which is of strong construction and capable of long life, and which has provision for properly lubricating the surfaces of the bushing and shaft.

With this object in view, the present invention consists in the bearing hereinafter described and particularly defined in the claim.

In the accompanying drawings illustrating what is now considered the preferred form of the invention, Fig. 1 is a side elevation partly in section of the bearing and shaft; Fig. 2 is a front elevation partly in section of the bearing and bushing keeper; Fig. 3 is an enlarged sectional elevation on line 3—3 of Fig. 2; and Fig. 4 is a top plan view of the bearing.

The invention is herein illustrated and described as embodied in a bearing for a locomotive side rod assembly. The shaft or crank 6 is journaled in a bushing 8 which is received in the bearing housing 10 formed at the end of the connecting or side rod 12. The bushing is provided with a radial keeper opening 14 which registers with a radial opening in the bearing housing, the lower portion 15 of which is of the same diameter as the opening 14, while the upper portion 16 is of larger diameter and is threaded at its upper end to receive the hollow cap 18. At the junction of the openings in the housing is formed a shoulder or seat 19.

A bushing keeper 20 cooperates with the housing and the bushing to prevent relative movement between them and to conduct lubricant to the bearing surfaces. The keeper comprises an integral machined member having a pin portion 21 of such a diameter as to fit closely in the openings 14 and 15, and a surmounting top or cup portion 22 of considerably larger diameter to fit loosely in the opening 16. The pin portion 21 is provided with an oil or grease passage 23, while the top portion 22 has a cup shaped chamber 24 to receive a supply of the lubricant. At the junction of the portions 20 and 22 is formed a beveled seat 25 which rests upon and engages over a large surface with the shoulder 19 at the bottom of the opening 16. The top of the keeper has an annular surface which is engaged by the bottom of the hollow screw cap 18 which also serves as a container for the lubricant.

The screw cap 18 is closed by a grease plug 28 which is threaded into the cap and which may be removed for renewal of the supply of lubricant.

Inasmuch as the keeper is firmly held in position between the shoulder 24 and the cap 18, and since the large diameter of the portion 16 of the recess allows the threads on the latter to be made of sufficient strength to withstand the considerable vibrations to which the bearing is subjected, there is no practical possibility of releasing the keeper from engagement with the bushing under any conditions of operation. The only stress to which the keeper is subjected is the shearing stress between the bushing and the bearing housing, which stress is of no consequence because the pin 20, since it carries no thread, may be of sufficient size to resist successfully.

While the invention has been illustrated and described as embodied in a locomotive side rod bearing, it will be understood that the invention is not to be considered as limited to this specific construction but may be embodied in bearings of other types.

Having thus described the invention, what is claimed is:

A bearing comprising, in combination, a bearing housing having a radial opening, the inner and outer portions of which are of two different diameters, the inner portion being of smaller diameter and having smooth walls throughout its length and the outer portion being of larger diameter and having smooth walls on its inner part and being internally threaded on its outer part, an annular seat being provided between said inner and outer portions, a bushing positioned within the bearing housing and having a radial opening registering with the inner portion of the opening in the housing and of the same diameter, a keeper for preventing movement of the bushing in the housing, the keeper comprising a smooth walled pin portion positioned in the inner portion of the opening in the housing and extending into the opening in the bushing and provided with a passage therethrough for the delivery of lubricant, and a top portion of enlarged diameter having smooth outer walls and fitting loosely within the smooth walled part of the outer portion of the opening in the bushing, said top portion being hollow to hold a supply of lubricant and having an annular shoulder to engage said seat, and a closure for the outer end of the opening in the bushing provided with an externally threaded portion to fit within the threaded portion of said opening and to engage the top of the keeper to clamp the latter with its shoulder in firm engagement with the annular seat, and also provided with means external of the bearing whereby the closure may be rotated to clamp the keeper in position under pressure.

In testimony whereof I have signed my name to this specification.

HERBERT PATTERSON.